(12) United States Patent
Padovani et al.

(10) Patent No.: US 8,929,609 B2
(45) Date of Patent: Jan. 6, 2015

(54) METHOD AND APPARATUS FOR SCALING GESTURE RECOGNITION TO PHYSICAL DIMENSIONS OF A USER

(75) Inventors: Niccolo A. Padovani, San Diego, CA (US); David Jonathan Julian, San Diego, CA (US); Virginia Walker Keating, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 13/276,742

(22) Filed: Oct. 19, 2011

(65) Prior Publication Data

US 2012/0270654 A1 Oct. 25, 2012

Related U.S. Application Data

(66) Substitute for application No. 61/430,112, filed on Jan. 5, 2011.

(51) Int. Cl.
*G06K 9/00* (2006.01)
*G06F 3/01* (2006.01)
*A63F 13/00* (2014.01)
*G06F 3/0346* (2013.01)

(52) U.S. Cl.
CPC .............. *G06F 3/017* (2013.01); *A63F 13/00* (2013.01); *G06F 3/011* (2013.01); *G06F 3/0346* (2013.01); *G06K 9/00335* (2013.01)
USPC .......................................................... 382/107

(58) Field of Classification Search
None
See application file for complete search history.

(56) References Cited

U.S. PATENT DOCUMENTS

| 6,066,794 | A | * | 5/2000 | Longo | ............................ 84/626 |
| 2009/0055123 | A1 | | 2/2009 | Razzell | |
| 2009/0116079 | A1 | * | 5/2009 | Baba | ............................. 358/474 |
| 2010/0013944 | A1 | * | 1/2010 | Venetsky et al. | ........... 348/222.1 |
| 2010/0097316 | A1 | | 4/2010 | Shaw et al. | |
| 2010/0113153 | A1 | | 5/2010 | Yen et al. | |
| 2010/0231512 | A1 | * | 9/2010 | Perez et al. | .................... 345/158 |
| 2010/0234094 | A1 | | 9/2010 | Gagner et al. | |
| 2010/0302138 | A1 | * | 12/2010 | Poot et al. | ..................... 345/156 |
| 2011/0151974 | A1 | | 6/2011 | Deaguero | |
| 2011/0164029 | A1 | * | 7/2011 | King et al. | ..................... 345/419 |
| 2011/0173204 | A1 | * | 7/2011 | Murillo et al. | ................ 707/741 |
| 2012/0007713 | A1 | * | 1/2012 | Nasiri et al. | .................. 340/5.81 |
| 2012/0165096 | A1 | * | 6/2012 | Geisner et al. | ................... 463/36 |
| 2013/0278501 | A1 | * | 10/2013 | Bulzacki | ........................ 345/157 |
| 2014/0028572 | A1 | * | 1/2014 | St. Clair | ........................ 345/173 |
| 2014/0201666 | A1 | * | 7/2014 | Bedikian et al. | ............... 715/771 |

FOREIGN PATENT DOCUMENTS

WO 2009116079 A2 9/2009

OTHER PUBLICATIONS

International Search Report and Written Opinion—PCT/US2011/065915—ISA/EPO—Apr. 2, 2012.
Alankus, et al., "Towards Customizable Games for Stroke Rehabilitation," CHI 2010: Therapy and Rehabilitation, Apr. 10-15, Atlanta, GA, USA, pp. 2113-2122.

* cited by examiner

*Primary Examiner* — Nancy Bitar
(74) *Attorney, Agent, or Firm* — Linda G. Gunderson

(57) ABSTRACT

An apparatus for gesture recognition, according to aspects of the disclosure contained herein, include a processing system configured to obtain at least one physical dimension of a user and determine a gesture of the user based on the at least one physical dimension independent of a location of the user relative to the apparatus. A method for gesture recognition is also disclosed.

35 Claims, 6 Drawing Sheets

*Physical Dimension Node Maps*

METHOD AND APPARATUS FOR SCALING GESTURE RECOGNITION TO PHYSICAL DIMENSIONS OF A USER

CROSS-REFERENCE TO RELATED APPLICATIONS

Claim of Priority Under 35 U.S.C. §119

The present application for patent claims priority to Provisional Application No. 61/430,112, entitled "Method and Apparatus for Scaling Gesture Recognition to Physical Dimensions of a User," filed Jan. 5, 2011, and assigned to the assignee hereof and hereby expressly incorporated by reference herein.

BACKGROUND

I. Field

The following description relates generally to computer science, and more particularly to method and apparatus for scaling gesture recognition to physical dimensions of a user.

II. Background

Some computer processing systems utilize gesture recognition as user input by interpreting human gestures. Typically, gestures originate from human body motion, such as hand gestures. User gesture input has grown in popularity as an alternative to established touch, pointing device, and speech input techniques.

Some conventional gesture recognition techniques utilize mechanical devices, such as accelerometers, to determine body motion and movement. However, problems arise in conventional systems that use mechanical devices for user gesture input when a necessary body motion or movement other than the hand is needed. For example, in conventional systems that rely heavily on accelerometers, the total gesture movement affects the output less than the point of maximum acceleration. Depending on position of the gesture, the distance traveled by the accelerometer is considered less important than the acceleration of the gesture. Thus, the accuracy of accelerometers for gesture input is reduced by the limited interpretation of body movement.

Interpretation of body movement may be improved if physical dimensions may be used along with sensor information. Thus, it would be desirable to be able to improve the accuracy of gesture input based on such physical dimensions as the physical dimensions of a user.

SUMMARY

The following presents a simplified summary of one or more aspects of methods and apparatuses to provide a basic understanding of such methods and apparatuses. This summary is not an extensive overview of all contemplated aspects of such methods and apparatuses, and is intended to neither identify key or critical elements of all aspects nor delineate the scope of any or all methods or apparatuses. Its sole purpose is to present some concepts of one or more aspects in a simplified form as a prelude to the more detailed description that is presented herein.

According to one aspect of the disclosure herein, an apparatus for gesture recognition includes a processing system configured to obtain at least one physical dimension of a user and determine a gesture of the user based on the at least one physical dimension independent of a location of the user relative to the apparatus.

According to one aspect of the disclosure herein, a method for gesture recognition includes obtaining at least one physical dimension of a user and determining a gesture of the user based on the at least one physical dimension independent of a location of the user relative to an apparatus.

According to one aspect of the disclosure herein, an apparatus for gesture recognition includes means for obtaining at least one physical dimension of a user and means for determining a gesture of the user based on the at least one physical dimension independent of a location of the user relative to the apparatus.

According to one aspect of the disclosure herein, a computer product includes a computer-readable medium including code for causing a computer to obtain at least one physical dimension of a user and code for causing a computer to determine a gesture of the user based on the at least one physical dimension independent of a location of the user relative to the apparatus.

To the accomplishment of the foregoing and related ends, the one or more aspects of the various methods and apparatuses presented throughout this disclosure comprise the features hereinafter fully described and particularly pointed out in the claims. The following description and the annexed drawings set forth in detail provide certain illustrative aspects of the various methods and apparatuses. These aspects are indicative, however, of but a few of the various ways in which the principles of such methods and apparatuses may be employed and the described aspects are intended to include all variations of such methods and apparatuses and their equivalents.

DETAILED DESCRIPTION

Various aspects of methods and apparatuses will be described more fully hereinafter with reference to the accompanying drawings. These methods and apparatuses may, however, be embodied in many different forms and should not be construed as limited to any specific structure or function presented in this disclosure. Rather, these aspects are provided so that this disclosure will be thorough and complete, and will fully convey the scope of these methods and apparatus to those skilled in the art. Based on the teachings herein, one skilled in the art should appreciate that that the scope of the disclosure is intended to cover any aspect of the methods and apparatus disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the aspects presented throughout this disclosure herein. It should be understood that any aspect of the disclosure herein may be embodied by one or more elements of a claim.

Figure 1A:
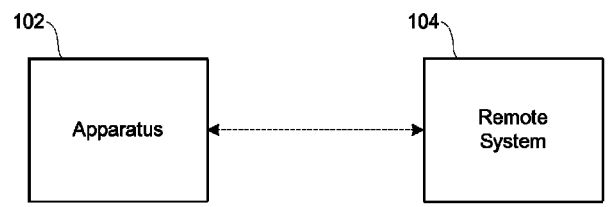
FIG. 1A shows an example of an apparatus and a separate remote system, in accordance with aspects of the disclosure herein.

Several aspects of this disclosure will now be presented with reference to FIG. 1A. FIG. 1A is a conceptual diagram illustrating an example of an apparatus 102 and a remote system 104 that is separate from the apparatus 102. The apparatus 102 may comprise any node capable of gesture recognition, including by way of example, a game console. In this aspect, user gestures may be utilized to control interactions with video games provided by the apparatus 102 to make the user's experience more interactive, and user gestures may be scaled according to at least one physical dimension of the user to improve the user's gesture input experience. In another aspect, simultaneous scaling of user gestures for multiple users may be achieved to improve gesture input experience for multiple users. Alternatively, the apparatus 102 may use any other node that can be remotely controlled by gestures, such as, a computer with gesture recognition capability to reduce or eliminate the need for traditional keyboard and mouse setup, a robotic system capable of gesture recognition, personal computing device (e.g., laptop, personal computer (PC), personal digital assistant (PDA)), a personal communication device (e.g., mobile phone), an entertainment device (e.g., game console, digital media player, television), sign language recognition systems, facial gesture recognition systems, or any other suitable node responsive to input methods other than traditional touch, pointing device, and speech.

User gestures may originate from any user body motion, movement, and/or pose, and user gestures include full body motion, movement, and/or pose and any body part motion, movement, and/or pose. For example, user gestures may include hand movements (e.g., punch, chop, lift, etc.), foot movements (e.g., kick, knee bend, etc.), head movements (e.g., head shake, nod, etc.), and/or body movements (e.g., jumping, kneeling, lying down, etc.).

The remote system 104 may be any suitable system capable of communicating with the apparatus 102 to support gesture recognition functionality. In at least one aspect, the remote system 104 may be configured to provide at least one input for gesture scaling by the apparatus 102 to improve the gesture accuracy of the user during the operation of the apparatus 102. By way of example, the gesture input required by a user to trigger an action or enter a command may be scaled based on at least one physical dimension of the user with the remote system 104. Various configurations of the remote system 104 to provide gesture scaling will be described in greater detail herein.

Referring to FIG. 1A, the apparatus 102 is shown with a wireless connection to the remote system 104. However, in other aspects, the apparatus 102 may have a wired connection to the remote system 104. In the case of a wireless connection, any suitable radio technology or wireless protocol may be used. By way of example, the apparatus 102 and the remote system 104 may be configured to support wireless communications using Ultra-Wideband (UWB) technology. UWB is a common technology for high speed short range communications and is defined as any radio technology having a spectrum that occupies a bandwidth greater than 20 percent of the center frequency, or a bandwidth of at least 500 MHz. Alternatively, the apparatus 102 and remote system 104 may be configured to support Bluetooth, Two-Way Infrared Protocol (TWIRP), or some other suitable wireless protocol.

In one implementation of the remote system 104, one or more sensors may be utilized and configured to provide one or more signals to the apparatus 102. Generally, a sensor is a device configured to measure or capture a physical quantity (e.g., motion, movement, acceleration, orientation, distance, range, height, length, etc.) and convert the physical quantity into a signal that can be transmitted to and processed by the apparatus 102. The one or more sensors may comprise one or more remote accelerometers, remote ranging sensors, remote gyros, or any other suitable sensor, or any combination thereof.

In another implementation of the remote system 104, a belt or harness may be utilized. The belt or harness may be wearable by a user. The belt or harness may include one or more sensors for measuring or capturing a physical dimension of the user and/or a movement by the user to determine a gesture of the user without regard to the location of the user relative to the apparatus 102. The one or more sensors may comprise one or more remote accelerometers, remote ranging sensors, remote gyros, or any other suitable sensor, or any combination thereof.

In another implementation of the remote system 104, a mat or platform may be utilized. The mat or platform may be positioned on the ground to establish ground level relative to a user. The mat or platform may include one or more sensors for capturing a physical dimension of the user and/or a movement by the user to determine a gesture of the user without regard to the location of the user relative to the apparatus 102. The mat or platform may be stationary or moveable to achieve various degrees of freedom. The one or more sensors may comprise one or more remote accelerometers, remote ranging sensors, remote gyros, or any other suitable sensor, or any combination thereof.

Figure 1B:
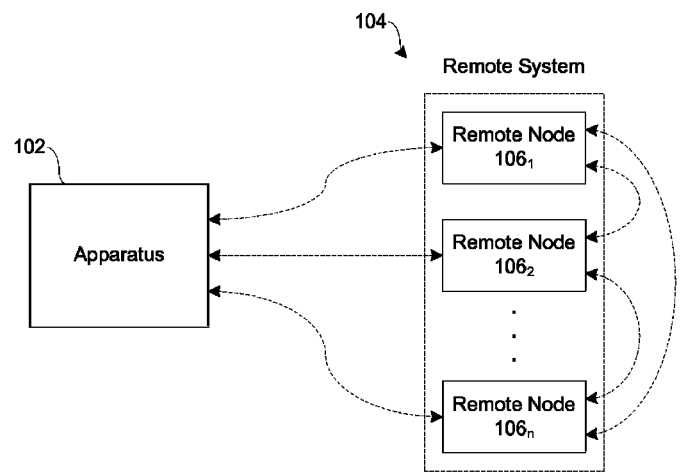
FIG. 1B shows an example of the apparatus and the separate remote system including one or more remote nodes, in accordance with aspects of the disclosure herein.

Referring to FIG. 1B, a conceptual diagram illustrates an example of the apparatus 102 and the remote system 104 comprising, in one implementation, a system 104 of remote nodes $106_1, 106_2, \ldots, 106n$, where n refers to any integer. The remote nodes $106_1, 106_2, \ldots, 106n$ may be any suitable node capable of communicating with the apparatus 102 and supporting gesture recognition functionality. In at least one implementation of the system 104, each remote node $106_1, 106_2, \ldots, 106n$ may be configured to provide at least one input for gesture scaling by the apparatus 102 to improve the gesture accuracy of the user during the operation of the apparatus 102. The apparatus 102 is shown with a wireless connection to each remote node $106_1, 106_2, \ldots, 106n$. However, in other implementations, the apparatus 102 may have a wired connection to one or more remote nodes $106_1, 106_2, \ldots, 106n$.

In one implementation of the system 104, each remote node $106_1, 106_2, \ldots, 106n$ comprises at least one remote sensor configured to provide at least one signal to the apparatus 102. Each remote sensor is configured to measure or capture a physical quantity (e.g., motion, movement, acceleration, orientation, distance, range, height, length, etc.) and convert the physical quantity into at least one signal that can be transmitted to and processed by the apparatus 102. Each remote sensor comprises at least one of a remote accelerometer, a remote ranging sensor, and a remote gyro.

Scaling refers to a linear transformation that alters (i.e., increases or decreases) the reference size of an object or objects by a scale factor that may be similar in all directions. For example, two objects of the same height may be positioned at different distances from a reference point. From the view of the reference point, the object positioned at a greater distance from the reference point may appear smaller, even though the objects are of the same height. Thus, knowing the distance of each object from the reference point and each object's height provides a way to scale the objects in a uniform manner to be judged as the same height without regard of each objects position with respect to the reference point.

The apparatus 102 may be used for scaling gesture recognition to physical dimensions of a user. As described herein, the apparatus 102 is configured to obtain at least one physical dimension of a user and determine a gesture of the user based on the at least one physical dimension without regard to the location of the user relative to the apparatus 102.

For example, in one implementation of the apparatus 102, a user may provide gesture input for triggering an action or entering a command may be scaled significantly different for users that vary in physical dimensions, such as height, arm span, etc. For instance, two different users, such as an adult and a child, may attempt to enter a similar command using a gesture input and the necessary movement may be too large for the child or too small for the adult. Therefore, gesture scaling may improve accuracy of user gesture input.

The apparatus 102 may achieve gesture scaling by obtaining or determining at least one physical dimension of the user. The at least one physical dimension of the user may include height of the user, arm span of the user, height of a handheld device held at a neutral position, such as arms at the user's side. In some instances, accuracy of a scaling may vary depending on which physical dimension is selected or how calculated if not directly inputted by the user.

In one implementation of the apparatus 102, a physical dimension of a user may be determined by direct user input via a user interface device, such as a handheld device. For example, prompting the user to enter height or length of arm span may provide an accurate representation of scaling necessary for accurate interpretation of gesture input by the user.

In another implementation of the apparatus 102, a physical dimension of a user may be determined by utilizing a system 104 of sensors and prompting user movement. For example, the user may be prompted to touch a body part, such as the user's head, and then touch a baseline reference point, such as the ground, with a handheld device having a mechanical sensing device, such as an accelerometer, gyro, etc. The system 104 of sensors may be configured to identify and record starts and/or stops in movement followed by large movements to be a distance from head to ground. This learning technique may provide an approximation of height as different users may move the device from head to the ground in different manners. Some users may move the handheld device a shortest possible distance, and some users may move the handheld device a longer distance from head to ground.

In another implementation of the apparatus 102, a physical dimension of a user may be determined by utilizing a system 104 of ranging sensors with known physical dimensions, such as height, paired with prompted user movement. For example, if a user stands on a sensing mat having one or more ranging sensors with known height of zero and the user is then prompted to touch their head with a handheld device having a ranging sensor, the height of the user may be calculated in an accurate manner. Height and other physical dimensions may be calculated accurately when the system 104 of multiple ranging sensors (e.g., two or more ranging sensors) is utilized in combination with prompted movement with a handheld device. Alternatively, the system 104 of multiple ranging sensors may include two or more ranging sensors, and/or the system 104 of multiple ranging sensors may or may not be worn or held by the user.

In one implementation of the apparatus 102, user gestures may be obtained and/or determined based on at least one physical dimension of the user and an identified movement, wherein determining a gesture includes calibration of scale based on a relationship between the at least one physical dimension and the at least one movement of the user. This relationship may be defined in a lookup table or calculated by an equation. The apparatus 102 may be configured to improve accuracy of gesture scaling through a learning algorithm that accesses a history of movements performed by the user and adjusts an initial scaling that may be based on the at least one physical dimension. Information related to user physical dimensions, user movements, scaling, calibration of scale, any and all relationships between user physical dimensions and user movements, and history of user physical dimensions and user movements may be stored as part of a computer readable medium.

In another implementation of the apparatus 102, gesture recognition may be scaled to one or more physical dimensions of a user by selectively adjusting movements for particular inputs and/or commands to any physical dimension of the user. Properly adjusted movement parameters may provide an improved gesture input experience for users, may add an element of fairness to gaming applications, may reduce a risk of body strain when stretching farther than a natural range of movement for a user (e.g., forced adaptation of undersized users to large scale reference points), and may reduce the amount of attention necessary for satisfying user parameters when movement is confined to an unnaturally narrow range (e.g., forced adaptation of oversized users to small scale reference points). Information related to user movement parameters along with user physical dimensions, user movements, scaling, calibration of scale, any and all relationships between user physical dimensions and user movements, and history of user physical dimensions and user movements may be stored as part of a computer readable medium.

It should be appreciated that the teachings provided herein may be incorporated into (e.g., implemented within or performed by) various apparatuses (e.g., devices). For example, aspects of the present disclosure may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a processor, a point-of-sale device, an audio/video device, a gaming console, a hearing aid, a set-top box, or any other suitable device. In particular, the teachings provided herein may be incorporated into various gaming apparatuses, consoles, devices, etc., such as Wii™, PlayStation™ or Xbox™, or other gaming platforms. The teachings provided herein may be incorporated into remote controls for gaming consoles, such as gaming controllers used with Wii™, PlayStation™ or Xbox 360™, or other gaming platforms, as well as gaming controllers used with personal computers, including tablets, computing pads, laptops, or desktops. Accordingly, any of the apparatuses, devices, and/or systems described herein may be implemented using some or all parts of the components described in FIGS. 1A and/or 1B.

Figure 2:
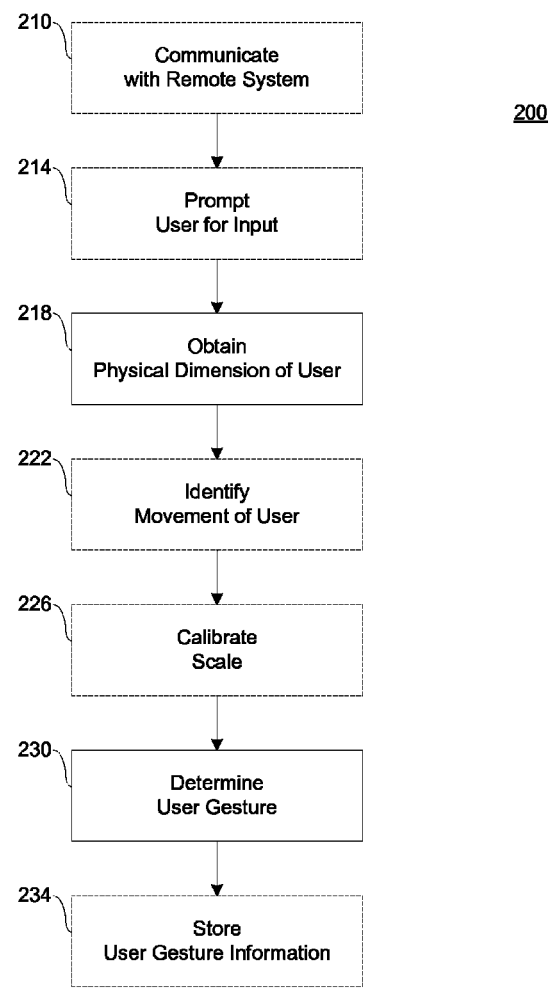
FIG. 2 shows an example of a process for scaling gesture recognition, in accordance with aspects of the disclosure herein.

FIG. 2 shows an example of a process 200 for scaling gesture recognition, in accordance with an aspect of the present disclosure. In block 210, the apparatus 102 may communicate with the remote system 104 (block 210). In block 214, the apparatus 102 may prompt the user for input. Alternatively, the apparatus 102 may be configured to communicate with one or more of the remote nodes $106_1$, $106_2$, . . . , $106n$ and may prompt the user for input. User input may be in the form of direct user input via a user interface component (e.g., a handheld device). For example, the user may be prompted to input the user's height, weight, or any other dimension of the user that may be useful in the scaling gesture determination. User input may also be in the form of a learned behavior, as described in greater detail herein.

In block 218, the apparatus 102 obtains or determines at least one physical dimension of the user. The at least one physical dimension may comprise at least one of height of the user, length of arm span of the user, and distance of the user from the apparatus 102. The apparatus 102 may be configured to obtain at least one physical dimension of the user by receiving the at least one physical dimension as an input by the user. The apparatus 102 may be configured to obtain at least one physical dimension of the user by learning the at least one physical dimension of the user from a sensor map having at least one sensor positioned proximate to the ground and a device held by the user at a physical height of the user. The apparatus 102 may be configured to obtain at least one physical dimension of the user by learning the at least one physical dimension of the user from a handheld device moved between a first position proximate to the ground and a second position proximate to at a physical height of the user. The apparatus 102 may be configured to obtain at least one physical dimension of the user by prompting the user to lift at least one arm until parallel to the ground to measure arm span of the user.

In block 222, the apparatus 102 may identify at least one movement of the user. As such, the apparatus 102 may be further configured for identifying at least one movement of the user. The apparatus 102 may be configured to identify the at least one movement of the user by capturing the at least one movement from at least one of a remote accelerometer, a remote ranging sensor, or a remote gyro. In other words, identification of at least one movement of the user may comprise capturing the at least one movement from at least one of a remote accelerometer, a remote ranging sensor, or a remote gyro.

In block 226, the apparatus 102 may calibrate scale for the user. The apparatus 102 may be configured to calibrate scale for the user based on a relationship between the at least one physical dimension and the at least one movement of the user.

In block 230, the apparatus 102 determines a gesture of the user. The apparatus 102 may be configured for determining the gesture of the user based on the at least one physical dimension without regard to a location of the user relative to the apparatus 102. The apparatus 102 may be further configured for identifying at least one movement of the user, wherein the gesture of the user may be determined based also on the at least one identified movement. The apparatus 102 may be configured to determine the gesture as a calibration of scale based on a relationship between the at least one physical dimension and the at least one movement of the user.

The apparatus 102 may utilize a lookup table determine the relationship between the at least one physical dimension and the at least one movement of the user. The apparatus 102 may define the relationship by utilizing an equation.

In block 234, the apparatus 102 may optionally store information related to the determined gesture of the user. The apparatus 102 may be configured to store information related to the determined gesture of the user based on the at least one physical dimension without regard to a location of the user relative to the apparatus 102. The apparatus 102 may be configured to store information related to the identified movement of the user and store information related to the determined gesture of the user based also on the at least one identified movement. The apparatus 102 may be configured store information related to the determined gesture as a calibration of scale based on a relationship between the at least one physical dimension and the at least one movement of the user. Any information related to the determined gesture of the user may be stored or recorded in a computer readable medium. In one implementation of the apparatus 102, obtaining, determining, identifying, calibrating, scaling, storing, recording, and/or communicating information related to user gestures, user physical dimensions, and/or user movements may be utilized by the apparatus 102 to replay as an avatar of the user, without departing from the scope of the disclosure herein.

It will be understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

Figure 3A:
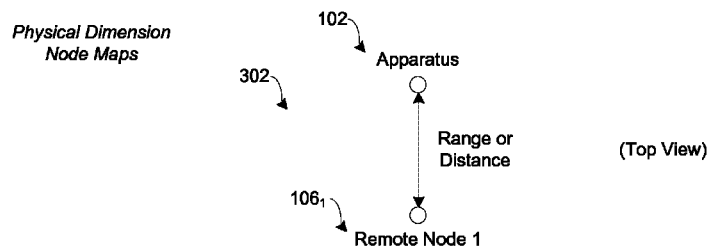
FIGS. 3A-3D show examples of node maps, in accordance with aspects of the disclosure herein.
Figure 3B:
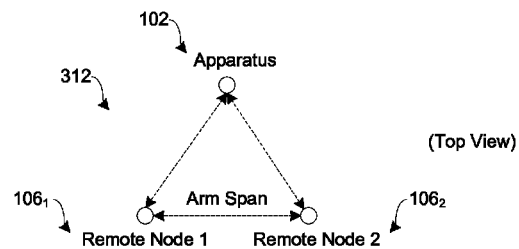
Figure 3C:
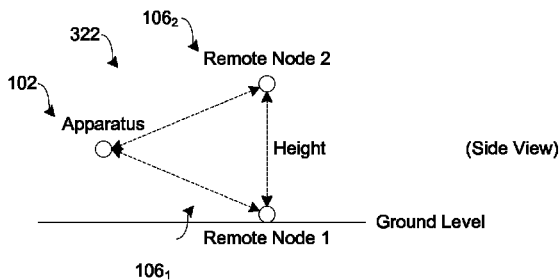

FIGS. 3A-3C are conceptual diagrams illustrating examples of the apparatus 102 and the remote system 104 being configured to determine at least one physical dimension of the user by utilizing one or more remote nodes $106_1$, $106_2$, ..., $106n$.

For example, referring to FIG. 3A, the apparatus 102 may determine at least one physical dimension of the user by learning the at least one physical dimension of the user from a node map 302 defining the range or distance between the apparatus 102 and at least one remote node $106_1$ positioned proximate to the user.

In another example, referring to FIG. 3B, the apparatus 102 may determine at least one physical dimension (e.g., length of arm span) of the user by learning the at least one physical dimension of the user from another node map 312 having at least one remote node $106_1$ positioned proximate to one hand of the user and at least one other remote node $106_2$ positioned proximate to the other hand of the user at a physical arm span of the user. The apparatus 102 may be configured to determine a range or distance between the apparatus 102 and each remote node $106_1$, $106_2$ to thereby establish a geometric measurement (e.g., triangulation) therebetween.

In one implementation, each remote node $106_1$, $106_2$ may be integrated as part of a handheld device, wherein learning the at least one physical dimension (e.g., length of arm span) of the user comprises moving the handheld device between a first position proximate to one outstretched arm of the user and a second position proximate to the other outstretched arm of the user. Determining arm span of the user may include prompting the user to physically lift each arm until parallel to ground level to measure arm span of the user, which comprises the distance between each hand or fingers of each hand when both arms are outstretched from the body and parallel with the ground.

In another implementation, a first remote node $106_1$ may be integrated as part of a first handheld device, and a second remote node $106_2$ may be integrated as part of a second handheld device, wherein learning the at least one physical dimension (e.g., length of arm span) of the user comprises holding the first handheld device at a first position proximate to one hand of the user and holding the second handheld device at a second position proximate to the other hand of the user. Determining arm span of the user may include prompting the user to physically lift each arm until parallel to ground level to measure arm span of the user, which comprises the distance between each hand or fingers of each hand when both arms are outstretched from the body and parallel with the ground.

In another example, referring to FIG. 3C, the apparatus 102 may determine at least one physical dimension (e.g., height) of the user by learning the at least one physical dimension of the user from another node map 322 having at least one remote node $106_1$ positioned proximate to ground level and at least one other remote node $106_2$ positioned proximate to the physical height of the user. The apparatus 102 may be configured to determine a range or distance between the apparatus 102 and each remote node $106_1$, $106_2$ to thereby establish a geometric measurement (e.g., triangulation) therebetween.

In one implementation, each remote node $106_1$, $106_2$ may be integrated as part of a handheld device, wherein learning the at least one physical dimension (e.g., height) of the user comprises moving the handheld device between a first position proximate to ground level and a second position proximate to the physical height of the user. Determining height of the user may include prompting the user to physically position the handheld device at ground level to obtain a first reference point at ground level and then prompting the user to physically position the handheld device proximate to the user's head to obtain a second reference point at the physical height of the user.

In another implementation, a first remote node $106_1$ may be integrated as part of a first handheld device, and a second remote node $106_2$ may be integrated as part of a second handheld device, wherein learning the at least one physical dimension (e.g., height) of the user comprises holding the first handheld device at a first position proximate to ground level and holding the second handheld device at a second position proximate to the top of the head of the user. Determining height of the user may include prompting the user to physically position the first handheld device at ground level to obtain a first reference point at ground level and then prompting the user to physically position the second handheld device proximate to the head of the user to obtain a second reference point at the physical height of the user.

It will be appreciated that one or more of the remote nodes $106_1$, $106_2$, . . . , $106n$ may be positioned anywhere proximate to the user's body or body parts (e.g., hands, feet, head, abdomen, shoulders, etc.) to determine and/or obtain one or more physical dimensions of the user to scale user gestures according to the user's physical dimensions.

It will be appreciated that any information related to a user including user physical dimensions, user movements, user movement parameters, user scaling parameters, user scaling parameters, any and all relationships between user physical dimensions and user movements, history of user physical dimensions, and history of user movements may be stored as part of a computer readable medium.

Figure 3D:
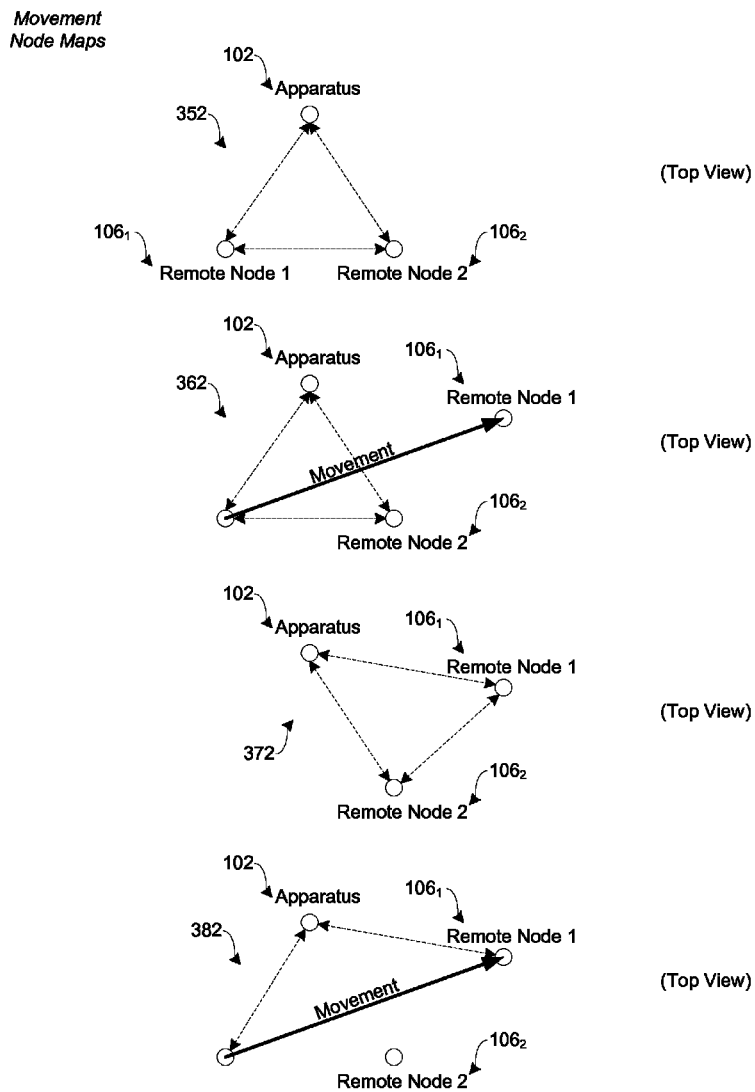

FIG. 3D is a conceptual diagram illustrating an example of the apparatus 102 and the remote system 104 being configured to determine at least one movement of the user by utilizing one or more remote nodes $106_1$, $106_2$, . . . , $106n$.

For example, referring to FIG. 3D, the apparatus 102 may determine at least one movement of the user by learning the at least one movement of the user from changes in node maps 352, 362, 372, 382, which identify movement of at least one remote node $106_1$ in reference to the apparatus 102. The apparatus 102 may be configured to define movement as a change in position of at least one remote node $106_1$ in reference to the position of the apparatus 102 and the position of at least one other remote node $106_2$. However, the apparatus 102 may be configured to define movement as a change in position of at least one remote node $106_1$ in reference to only the position of the apparatus 102.

Referring to node map 352 of FIG. 3D, the apparatus 102 may be configured to calculate a range or distance between the apparatus 102 and each remote node $106_1$, $106_2$ to thereby establish a first geometric measurement (e.g., triangulation) therebetween. The node map 352 refers to a first node configuration of the apparatus 102 in relation to the remote nodes $106_1$, $106_2$. Referring to node map 362, the user generates movement by moving the first remote node $106_1$ to another position to establish a second node configuration as shown by node map 372. Referring to node map 372, the apparatus 102 is configured to calculate another range or distance between the apparatus 102 and each remote node $106_1$, $106_2$ to thereby establish a second geometric measurement (e.g., triangulation) therebetween. The movement range or distance may be determined by calculating the change in position. As such, referring to node map 382, the apparatus 102 is configured to calculate still another range or distance between the apparatus 102 and the change in position of the remote node $106_1$ to thereby establish a third geometric measurement (e.g., triangulation) therebetween, which results in determining the range or distance of movement.

It will be appreciated that any information related to node maps including node maps corresponding to user physical dimensions, user movements, user movement parameters, user scaling parameters, user scaling parameters, any and all relationships between user physical dimensions and user movements, history of user physical dimensions, and history of user movements may be stored as part of a computer readable medium.

As described herein, user gestures may originate from any user body motion, movement, and/or pose, and user gestures include full body motion, movement, and/or pose and any body part motion, movement, and/or pose. For example, user gestures may include hand movements (e.g., punch, chop, lift, etc.), foot movements (e.g., kick, knee bend, etc.), head movements (e.g., head shake, nod, etc.), and/or body movements (e.g., jumping, kneeling, lying down, etc.).

The apparatus 102 may be configured to determine user gestures as 2-dimensional and 3-dimensional spatial positioning of at least one body point (e.g., as defined by a node). The apparatus 102 may be configured to translate changes in 2-dimensional and 3-dimensional spatial positioning of a body point into a user gesture, which may be referred to as body motion, body movement, and/or changes between body poses. The apparatus 102 may be configured to determine 2-dimensional and 3-dimensional spatial positioning of a body point relevant to a node on a user's body and/or a node on another user's body. The apparatus 102 may be configured to determine 2-dimensional and 3-dimensional spatial positioning of a body point relevant to the apparatus 102.

The apparatus 102 may be configured to determine user gestures (e.g., body motion, movement, and/or pose) by obtaining one or more physical dimensions that are between at least two body parts of the user (e.g., wrist and foot). The apparatus 102 may be configured to determine user gestures (e.g., body motion, movement, and/or pose) by obtaining one or more physical dimensions that are between at least two body parts of separate users (e.g., a distance between hands of different users). The apparatus 102 may be configured to simultaneously scale user gestures for separate users.

The apparatus 102 may be configured to determine user gestures by capturing signals from one or more remote ranging sensors that cover ranging (e.g., distance) between at least two body points on the user's body. The apparatus 102 may be configured to determine user gestures by capturing signals from one or more remote ranging sensors from a handheld device and/or a wearable device, belt, or harness that may be attached to the body, a body part, and/or as part of clothing.

Figure 4:
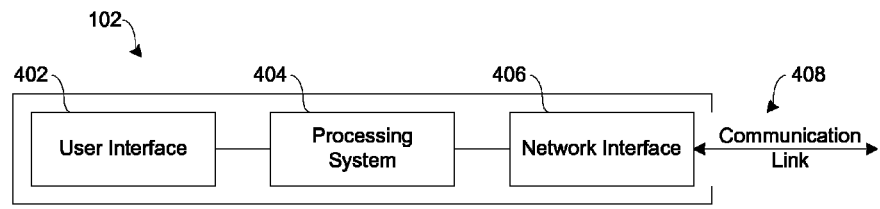
FIGS. 4-6 show examples of apparatuses suitable for implementing aspects of the disclosure.

FIG. 4 is a block diagram of an apparatus 102 suitable for implementing various aspects of the disclosure herein.

In accordance with an aspect of the disclosure herein, the apparatus 102 comprises a user interface 402 that may be implemented to interact with a user. The user interface 402 may include the utilization of one or more of an input component (e.g., keyboard), a cursor control component (e.g., mouse or trackball), and image capture component (e.g., analog or digital camera). The user interface 402 may include the utilization of a display component (e.g., CRT or LCD).

In accordance with an aspect of the disclosure herein, the apparatus 102 comprises a processing system 404 that may be implemented with one or more processors. The one or more processors, or any of them, may be dedicated hardware or a hardware platform for executing software on a computer-readable medium. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In various implementations, the one or more processors may include, by way of example, any combination of microprocessors, microcontrollers, digital signal processors (DSPs), field programmable gate arrays (FPGAs), programmable logic devices (PLDs), state machines, gated logic, discrete hardware circuits, and other suitable processors configured to perform the various functionalities described throughout this disclosure.

In accordance with aspects of the disclosure herein, the functions described may be implemented in hardware, software, firmware, or any combination thereof. If implemented in software, the functions may be stored on or transmitted over as one or more instructions or code on a computer-readable medium. In various implementations, the computer-readable medium may include both computer storage media and communication media including any medium that facilitates transfer of a computer program from one place to another. A storage media may be any available media that can be accessed by a computer or processor. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects, computer readable medium may comprise non-transitory computer readable medium (e.g., tangible media). In addition, in some aspects, computer readable medium may comprise transitory computer readable medium (e.g., a signal). Combinations of the above should also be included within the scope of computer-readable media. The computer-readable medium may be embodied in a computer-program product. By way of example, a computer-program product may include a computer-readable medium in packaging materials.

In accordance with an aspect of the disclosure herein, the apparatus 102 comprises a network interface 406 that may be implemented to receive and/or transmit signals via a communication link 408. For example, the network interface 406 may comprise a receiver, a transmitter, a receiver and a transmitter, or a transceiver. As such, the network interface 406 may be configured to receive information from a user, and the network interface 406 may be configured to transmit information to a user. The network interface 406 may utilize a wireless communication device and an antenna, such as a mobile cellular device, a wireless broadband device, a wireless satellite device, or various other types of wireless communication devices including radio frequency (RF), microwave frequency (MWF), and/or infrared frequency (IRF) devices adapted for wireless communication. The network interface 406 may utilize a network interface component (e.g., modem or Ethernet card) to receive and transmit wired and/or wireless signals. The network interface 406 may be adapted to interface and communicate with various types of networks, such as local area networks (LAN), wide area networks (WAN), public telephone switched networks (PTSN), and/or various other wired or wireless networks, including telecommunications, mobile, and cellular phone networks. The network interface 406 may be adapted to interface with a DSL (e.g., Digital Subscriber Line) modem, a PSTN (Public Switched Telephone Network) modem, an Ethernet device, and/or various other types of wired and/or wireless network communication devices adapted for wired and/or wireless communication.

Figure 5:
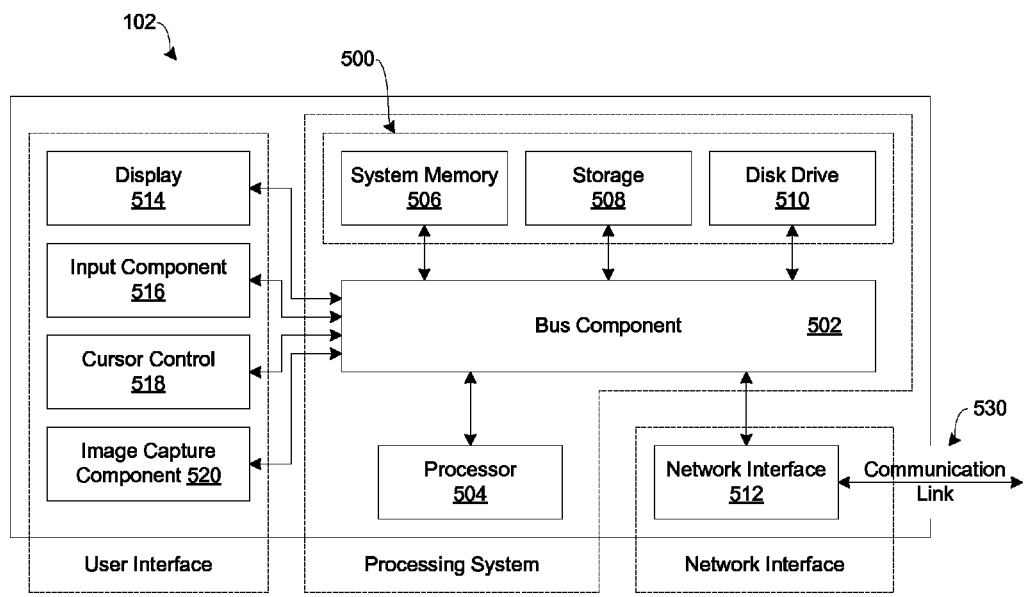

FIG. 5 is a block diagram of an apparatus 102 suitable for implementing various aspects of the disclosure herein. The apparatus 102 may comprise a wired or wireless computing/processing/communication device (e.g., laptop, PC, PDA, mobile phone, game console, digital media player, television, etc.) capable of communicating with other wired or wireless devices (e.g., the remote system 104 and one or more of the remote nodes $106_1$, $106_2$, ..., $106n$). Hence, it should be appreciated that the apparatus 102 may be implemented as a processing system in a manner as follows.

In accordance with various aspects of the disclosure herein, the apparatus 102 includes a processing system having a bus 502 or other communication mechanism for communicating information, which interconnects subsystems and components, such as processor 504 (e.g., processor, micro-controller, digital signal processor (DSP), etc.) and one or more computer readable media 500. The computer readable media 500 may include one or more of system memory 506 (e.g., RAM), static storage 508 (e.g., ROM), and disk drive storage 510 (e.g., magnetic or optical). The apparatus 102 includes network interface 512 (e.g., wired or wireless modem), display 514 (e.g., CRT or LCD), input component 516 (e.g., keyboard), cursor control 518 (e.g., mouse or trackball), and image capture component 520 (e.g., analog or digital camera). The disk drive 510 may comprise a database having one or more disk drives. It should be appreciated that any one of the memory components 506, 508, 510 may comprise a computer readable medium and be integrated as part of the processing component 504 to store computer readable instructions or code related thereto for performing various aspects of the disclosure herein. The network interface 512 may utilize a wireless communication device and an antenna to communicate over the communication link 530.

In accordance with aspects of the disclosure herein, apparatus 102 performs specific operations by processor 504 executing one or more sequences of one or more instructions contained in computer readable media 500, such as system memory 506. Such instructions may be read into system memory 506 from another computer readable medium, such as static storage 508 or disk drive 510. Hard-wired circuitry may be used in place of or in combination with software instructions to implement the disclosure herein.

Logic may be encoded in computer readable medium 500, which may refer to any medium that participates in providing instructions to processor 504 for execution. Such a medium may take many forms, including but not limited to, non-volatile media and volatile media. In various implementations, non-volatile media includes optical or magnetic disks, such as disk drive 510, and volatile media includes dynamic memory, such as system memory 506. In one aspect, data and information related to execution instructions may be transmitted to the apparatus 102 via transmission media, such as in the form of acoustic or light waves, including those generated during radio wave, micro wave, and infrared data communications. In various implementations, transmission media may include coaxial cables, copper wire, and fiber optics, including wires that comprise bus 502

Some common forms of computer readable media 500 includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various aspects of the disclosure herein, execution of instruction sequences to practice the disclosure herein may be performed by apparatus 102. In various other aspects of the disclosure herein, a plurality of apparatuses 102 coupled by communication link 530 (e.g., network 160 of FIG. 1, such as a LAN, WLAN, PTSN, and/or various other wired or wireless networks, including telecommunications, mobile, and cellular phone networks) may perform instruction sequences to practice the disclosure herein in coordination with one another.

The apparatus 102 may transmit and receive messages, data, information and instructions, including one or more programs (i.e., application code) through communication link 530 and network interface 512. Received program code may be executed by processor 504 as received and/or stored in disk drive 510 or some other non-volatile memory or storage component for execution.

Where applicable, various aspects provided by the disclosure herein may be implemented using hardware, software, or combinations of hardware and software. Also, where applicable, the various hardware components and/or software components set forth herein may be combined into composite components comprising software, hardware, and/or both without departing from aspects of the disclosure herein. Where applicable, the various hardware components and/or software components set forth herein may be separated into sub-components comprising software, hardware, or both without departing from the scope of the disclosure herein. In addition, where applicable, it is contemplated that software components may be implemented as hardware components and vice-versa.

Software, in accordance with the disclosure herein, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 6:
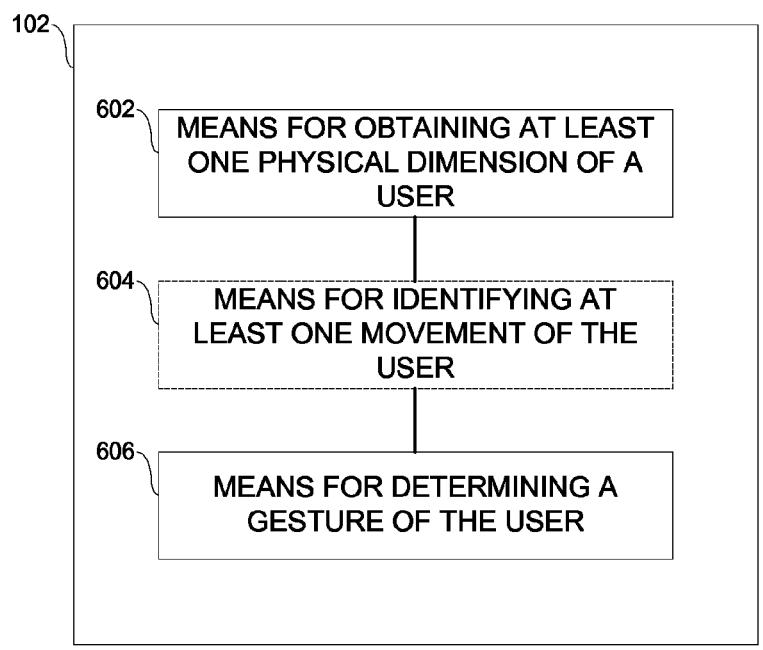

The various operations of methods described above may be performed by any suitable means capable of performing the corresponding functions. The means may include various hardware and/or software component(s) and/or module(s), including, but not limited to a circuit, an application specific integrated circuit (ASIC), a processor, or a processing system. Generally, where there are operations illustrated in the figures, those operations may have corresponding counterpart means-plus-function components. For example, FIG. 6 is a functional block diagram of the apparatus 102 with respect to means-plus-function components. According to one aspect of the disclosure herein, the apparatus 102 provides means 602 for obtaining at least one physical dimension of a user and means 606 for determining a gesture of the user. In one implementation of the apparatus 102, the gesture of the user may be determined based on the at least one physical dimension without regard to a location of the user relative to the apparatus 102. Alternatively, the code alone on the computer-readable medium may provide means for performing these functions and/or methods.

Referring to FIG. 6, the apparatus 102 may further provide means 604 for identifying at least one movement of the user. In one aspect of the apparatus 102, the means 606 for determining the gesture may be configured to determine the gesture based also on the at least one identified movement. In another aspect of the apparatus 102, the means 606 for determining the gesture may be configured to determine the gesture as a calibration of scale based on a relationship between the at least one physical dimension of the user and the at least one movement of the user. The apparatus 102 may further provide means for storing a lookup table comprising a relationship between the at least one physical dimension of the user and the at least one movement of the user.

Further referring to FIG. 6, the means 602 for obtaining the at least one physical dimension of the user may be configured to learn the at least one physical dimension of the user from a sensor map having at least one sensor positioned proximate to the ground and a device held by the user at a physical height of the user. The means 602 for obtaining the at least one physical dimension of the user may also be configured to learn the at least one physical dimension of the user from a handheld device moved between a first position proximate to ground and a second position proximate to at a physical height of the user. The means 602 for obtaining the at least one physical dimension of the user may further be configured to prompt the user to lift at least one arm until parallel to the ground to measure arm span of the user. These and other means may be implemented using the remote system 104, as illustrated in FIG. 1, above. For example, the remote system 104 may comprise one or more sensors configured to measure or capture a physical quantity. The sensors may be ranging or position sensors that provide information useful for determining ranging or position information through which at least one physical dimension of the user may be learned.

It should be appreciated that like reference numerals are used to identify like elements illustrated in one or more of the figures, wherein showings therein are for purposes of illustrating aspects of the disclosure herein and not for purposes of limiting the same.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for gesture recognition comprising:
   a processing system configured to:
      determine an at least one physical dimension of a user;
      identify an at least one movement of the user; and
      determine a gesture of the user independent of a location of the user relative to the apparatus by scaling gesture recognition to the at least one physical dimension, wherein the scaling includes adjusting at least one movement parameter used to determine the gesture of the user based on the at least one physical dimension, and wherein the processing system is further configured to scale the gesture recognition to the at least one physical dimension using a scale factor that is similar in all directions.

2. The apparatus of claim 1, wherein the processing system is further configured to adjust the at least one movement parameter based on a selected at least one physical dimension, and wherein the selected at least one physical dimension is selected from among a plurality of determined physical dimensions of the user.

3. The apparatus of claim 1, wherein the processing system is further configured to determine the gesture based on a relationship between the at least one physical dimension of the user and the at least one movement of the user.

4. The apparatus of claim 3, wherein the relationship is defined by at least one of an equation or a lookup table comprising at least one association between the at least one physical dimension of the user and the at least one movement of the user.

5. The apparatus of claim 1, wherein identifying the at least one movement comprises capturing the at least one movement from at least one of a remote accelerometer, a remote ranging sensor, or a remote gyro.

6. The apparatus of claim 1, wherein the at least one physical dimension comprises at least one of a height of the user or a length of an arm span of the user.

7. The apparatus of claim 1, wherein the at least one physical dimension is determined by at least one of: receiving information from a handheld device moved between a first position proximate to ground and a second position proximate to a physical height of the user, or receiving information from at least one remote ranging sensor not worn by the user and a handheld device.

8. A method for gesture recognition comprising:
   determining an at least one physical dimension of a user;
   identifying an at least one movement of the user, wherein the movement is captured by at least one remote sensor; and
   determining a gesture of the user independent of a location of the user relative to the at least one remote sensor, wherein:
      the gesture is scaled to the at least one physical dimension, and the scaling includes adjusting at least one movement parameter used to determine the gesture of the user based on the at least one physical dimension, and wherein the processing system is further configured to scale the gesture recognition to the at least one physical dimension using a scale factor that is similar in all directions.

9. The method of claim 8, further comprising:
   adjusting the at least one movement parameter based on a selected at least one physical dimension, and wherein the selected at least one physical dimension is selected from among a plurality of determined physical dimensions of the user.

10. The method of claim 8, wherein the gesture of the user is determined based on a relationship between the at least one physical dimension of the user and the at least one movement of the user.

11. The method of claim 10, wherein the relationship is defined by at least one of an equation or a lookup table comprising at least one association between the at least one physical dimension of the user and the at least one movement of the user.

12. The method of claim 8, wherein the identifying the at least one movement of the user comprises capturing the at least one movement from at least one of a remote accelerometer, a remote ranging sensor, or a remote gyro.

13. The method of claim 8, wherein the at least one physical dimension comprises at least one of a height of the user or a length of an arm span of the user.

14. The method of claim 8, wherein the determining of the at least one physical dimension comprises at least one of: processing information received from a handheld device moved between a first position proximate to ground and a second position proximate to a physical height of the user, or processing information received from at least one remote ranging sensor not worn by the user and a handheld device.

15. An apparatus for gesture recognition comprising:
   means for determining an at least one physical dimension of a user;
   means for identifying an at least one movement of the user; and
   means for determining a gesture of the user independent of a location of the user relative to the apparatus by scaling gesture recognition to the at least one physical dimension, wherein the means for determining further includes means for adjusting at least one movement parameter used to determine the gesture of the user based on the at least one physical dimension, wherein the processing system is further configured to scale the gesture recognition to the at least one physical dimension using a scale factor that is similar in all directions.

16. The apparatus of claim 15, further comprising:
means for adjusting the at least one movement parameter based on a selected at least one physical dimension, and wherein the selected at least one physical dimension is selected from among a plurality of determined physical dimensions of the user.

17. The apparatus of claim 15, wherein the means for determining a gesture is configured to determine the gesture based on a relationship between the at least one physical dimension of the user and the at least one movement of the user.

18. The apparatus of claim 17, further comprising means for storing a lookup table comprising the relationship between the at least one physical dimension of the user and the at least one movement of the user.

19. The apparatus of claim 17, wherein the relationship is defined by at least one of an equation or a lookup table comprising at least one association between the at least one physical dimension of the user and the at least one movement of the user.

20. The apparatus of claim 15, wherein the means for identifying the at least one movement of the user comprises means for capturing the at least one movement from at least one of a remote accelerometer, a remote ranging sensor, or a remote gyro.

21. The apparatus of claim 15, wherein the at least one physical dimension comprises at least one of a height of the user or a length of an arm span of the user.

22. The apparatus of claim 15, wherein the means for obtaining the at least one physical dimension comprises at least one of: means for receiving information from a handheld device moved between a first position proximate to ground and a second position proximate to a physical height of the user, or means for receiving information from at least one remote ranging sensor not worn by the user and a handheld device.

23. A computer program product comprising:
a non-transitory computer-readable medium comprising codes executable to cause an apparatus to:
determine an at least one physical dimension of a user;
identify an at least one movement of the user; and
determine a gesture of the user independent of a location of the user relative to the apparatus by scaling gesture recognition to the at least one physical dimension, wherein the scaling further includes adjusting at least one movement parameter used to determine the gesture of the user based on the at least one physical dimension, and wherein the processing system is further configured to scale the gesture recognition to the at least one physical dimension using a scale factor that is similar in all directions.

24. The apparatus of claim 1, wherein the processing system is further configured to determine the at least one physical dimension by:
prompting the user for a movement; and
receiving information capturing the prompted user movement from at least one sensor.

25. The apparatus of claim 1, wherein the processing system is further configured to determine the at least one physical dimension by:
prompting the user to input the at least one physical dimension; and
receiving direct user input via a user interface.

26. The apparatus of claim 1, wherein the processing system is further configured to modify the scaling based on a stored history of movements performed by the user.

27. The method of claim 8, wherein the at least one physical dimension is determined by:
prompting the user for a movement; and
capturing the prompted movement of the user using at least one sensor.

28. The method of claim 8, wherein the determining of the at least one physical dimension further comprises:
prompting the user to input the at least one physical dimension; and
receiving direct user input via a user interface.

29. The method of claim 8, wherein the determining of the gesture of the user further includes modifying the scaling based on a stored history of movements performed by the user.

30. The apparatus of claim 15, wherein the at least one physical dimension is determined by:
prompting the user for a movement; and
capturing the prompted user movement from at least one sensor.

31. The apparatus of claim 15, wherein the at least one physical dimension is determined by:
prompting the user to input the at least one physical dimension; and
receiving direct user input via a user interface.

32. The apparatus of claim 15, wherein the means for determining the gesture of the user further includes modifying the scaling based on a stored history of movements performed by the user.

33. The computer program product of claim 23, wherein the non-transitory computer-readable medium further comprising codes executable to cause an apparatus to determine the at least one physical dimension by:
prompting the user for a movement; and
capturing the prompted user movement from at least one sensor.

34. The computer program product of claim 23, wherein the non-transitory computer-readable medium further comprising codes executable to cause an apparatus to determine the at least one physical dimension by:
prompting the user to input the at least one physical dimension; and
receiving direct user input via a user interface.

35. The computer program product of claim 23, wherein the non-transitory computer-readable medium further comprising codes executable to cause an apparatus to modify the scaling based on a stored history of movements performed by the user.

* * * * *